United States Patent [19]

Pompe

[11] Patent Number: 5,023,971
[45] Date of Patent: Jun. 18, 1991

[54] CONTACT LENS SURFACE TREATMENT APPARATUS

[76] Inventor: Larry W. Pompe, 115 ½ E. Litchfield Ave., Willmar, Minn. 56201

[21] Appl. No.: 398,986

[22] Filed: Aug. 28, 1989

Related U.S. Application Data

[63] Continuation-in-part of Ser. No. 262,274, Oct. 25, 1988, abandoned.

[51] Int. Cl.⁵ ............................................. G02C 13/00
[52] U.S. Cl. ................................ 15/97.1; 15/104.92; 15/104.94; 15/214
[58] Field of Search ............. 15/97 R, 104.92, 104.93, 15/104.94, 214

[56] References Cited

U.S. PATENT DOCUMENTS 2,121,701  6/1938  Landers .
2,867,954  1/1959  Phillips .
3,063,083  11/1962 Obitts ................................ 15/214 X
3,344,461  10/1967 Floor ..................................... 15/214
4,187,574  2/1980  Wrue ............................... 15/97 R X
4,434,520  3/1984  Caniglia .
4,504,994  3/1985  Johnston ........................... 15/214 X
4,558,482  12/1985 Neuman et al. .................... 15/97 R
4,559,662  12/1985 Kunold ............................ 15/97 R X
4,779,300  10/1988 Pompe .

FOREIGN PATENT DOCUMENTS 806980 1/1959 United Kingdom .

OTHER PUBLICATIONS

The Boston Lens Cleaning Polish and Manual Polishing Machine Instruction Sheet (1982).
Fitting Guide for Hard and Soft Contact Lenses by Harold Stein and Bernard Slatt, pulished by the C. U. Mosby Company, Chapter 15-Office Modification of Hard Lenses, (1977).

Primary Examiner—Chris K. Moore
Attorney, Agent, or Firm—Burd, Bartz & Gutenkauf

[57] ABSTRACT

A manually operable contact lens surface treatment apparatus for performing such contact lens surface treatment procedures as polishing, cleaning or lens modification. The apparatus has a sleeve like housing with open ends. A mounting drum is removably inserted in one end of the housing and carries a cloth or pad extended across the retainer opening for access from the opposite end of the sleeve. A contact lens holder is releasably mounted in the opposite end of the sleeve by a mounting assembly permitting axial rotation of the lens holder and axial movement within the sleeve so that a contact lens secured by the holder can be brought into contact with the pad and rotated with respect to it in order to perform a procedure on the lens. A first form of contact lens holder is for holding a rigid lens and a second form is for holding a soft contact lens.

26 Claims, 3 Drawing Sheets

CONTACT LENS SURFACE TREATMENT APPARATUS

CROSS REFERENCE TO RELATED APPLICATIONS

This application is a continuation-in-part application of Ser. No. 262,274 filed Oct. 25, 1988 entitled CONTACT LENS SURFACE TREATMENT APPARATUS, now abandoned.

BACKGROUND OF THE INVENTION

Both soft and rigid contact lenses require periodic cleaning. Rigid contact lens cleaning and polishing procedures are presently beyond the ability of the normal contact lens wearer and should be done professionally. Motorized cleaning and polishing units are commonly used to accomplish this end. Such units must be carefully used. Too much abrasion through over polishing can alter the optical characteristics of the lens upon excessive removal of material. Excessive heat build up can also damage the lens. The introduction of the gas permeable lenses has greatly benefited the contact lens wearer through increased comfort and corneal health. Maintenance of such lenses is a serious challenge not only for the contact lens wearer, but for the professional practitioner as well. The fragile nature of the lens material makes routine and necessary office cleaning and polishing procedures hazardous. Greater potential for damage to lenses exists through the use of motorized lens treatment apparatus. Harmful heat build up can occur in only a few seconds. A diminished or destroyed wetability property of the rigid gas permeable lens means comfort problems for the wearer. Also, considerable care and skill is necessary to avoid optics blur as well as power changes.

Practitioners presently attempt to polish the rigid gas permeable lens without motorized apparatus by rubbing the lens on a velveteen cloth piece held in the hand or on a flat work area. This method offers no precise control of the pressure exerted on the lens. Plastic is removed unevenly usually resulting in abberation of the lens surfaces. This same method is also used in the cleaning of lenses using a surfactant solution.

Lens modification of the rigid gas permeable lens can also be a hazardous procedure due to the delicate structure of the lens. Rigid lenses have two to five separate radii of curvatrure on the back surface of the lens to provide proper alignment on the cornea and proper tear exchange under the lens. Most of these curves have to do with the periphery of the lens with the central large area of curve being the optical zone. Modification for the most part involves widening, increasing or decreasing the radii of curvature of peripheral curves on the lens.

Soft contact lenses are beset by cleaning problems not encountered with rigid lenses because by their nature they are prone to lipid and protein coating rendering them extremely difficult to clean. The fragile nature of the lens precludes the use of solvents or strong chemical cleansers. The most common method still involves daily digital cleaning with a surfactant cleaner in conjunction with weekly enzyme cleaning. However the skin is a poor cleaning surface with a texture unable to provide a scrubbing or brushing action suitable for cleaning the lens surface.

SUMMARY OF THE INVENTION

The invention relates to a hand held, manually operable contact lens surface treatment apparatus which permits great control over surface treatment procedures on the contact lens such as cleaning, polishing or modification of the lens with minimal or no damage to the lens or optic properties thereof. In terms of cleaning or polishing the lens, a cloth or pad is stretched over the opening of a mounting drum. Edges of the pad overlap the outer annular side walls of the drum. The drum is inserted in friction fit relationship into one end of an annular sleeve or housing. A contact lens mount includes a rotating assembly that fits in the opposite end of the housing and holds a contact lens holder. One preferred embodiment holder engages a rigid contact lens through suction force and positions it with respect to the pad in the housing. The holder is rotatable with respect to the mount. The contact lens is brought into bearing relationship with the polishing or cleaning pad having either a polishing or cleansing solution on it depending upon the procedure. The contact lens is rotated against the pad by rotating the holder. The amount of pressure and the area of contact with the pad is variable by the user according to the polishing or cleaning requirements. The contact lens is periodically inspected visually for the proper amount of polising. Manual manipulation of the contact lens assures that there is no heat build up or over polishing. The amount of force applied to each portion of the contact lens is strictly within control of the user.

An alternative holder is comprised as a rigid member having a convex tip for holding a wet soft contact lens through surface tension. The holder is also mounted in the rotating assembly and brought into bearing relationship with a cleaning pad carrying a surfactant solution.

The apparatus is also usable for the modification of rigid lens curvatures, i.e. peripheral, intermediate and posterior curves and blending curves of the hard lens. Modification is performed in the same manner as the polishing of the concave side of rigid lenses.

DESCRIPTION OF A PREFERRED EMBODIMENT

Figures 1, 2, 4:
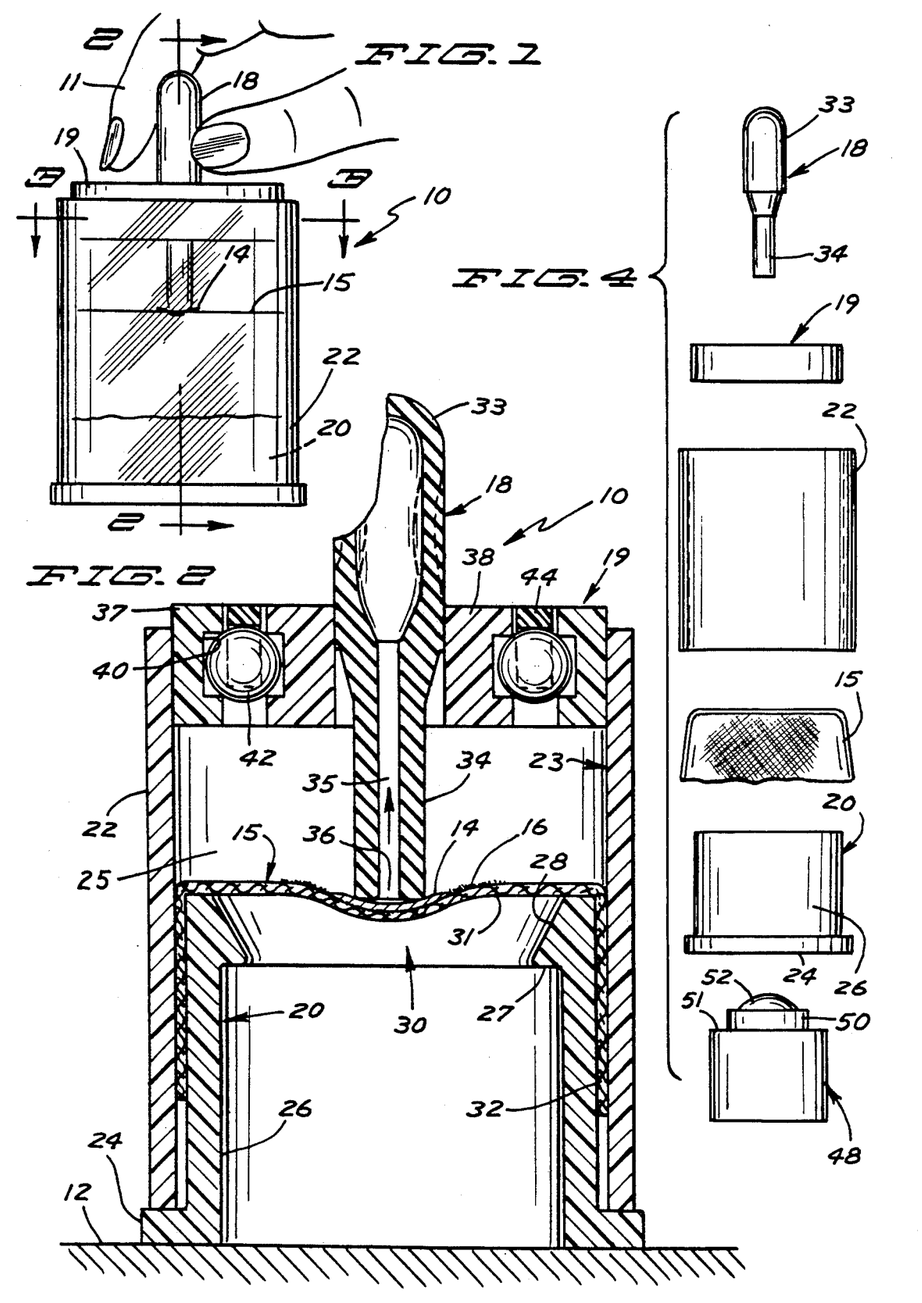
FIG. 1 is a side elevational view of the contact lens surface treatment apparatus according to one form of the invention shown in use in a contact lens polishing procedure.
FIG. 2 is an enlarged sectional view of the contact lens surface treatment apparatus of FIG. 1 taken along the line 2—2 thereof.
FIG. 4 is an assembly view of the contact lens surface treatment apparatus of FIG. 1 and including a lens mounting block.

Referring to FIGS. 1 and 2, there is shown a lens surface treatment apparatus according to one form of the invention effective for surface treatment of a rigid contact lens and indicated generally at 10. Apparatus 10 is being manipulated by the fingers 11 of the user and is positioned on a stationary surface 12 or, alternatively, in the opposite hand of the user. The lens surface treatment apparatus is shown for purposes of illustration in use to polish a rigid contact lens 14 with respect to a polishing pad 15 carrying a polish substance 16. The contact lens 14, as shown in FIG. 2, is secured to a contact lens holder 18 which is rotatably mounted in a contact lens holder mount or chuck 19. The polishing pad 15 is stretched over the opening of a retainer or mounting drum 20 which is installed in one end of a sleeve or cylindrical housing 22. The chuck or lens holder mount 19 is installed in the opposite end of the housing 22.

Housing 22 is generally cylindrical and open ended, with a chamber 25 defined by an inner annular wall 23. Housing 22 is preferably transparent and can be of suitable plastic or glass or the like. Mounting drum 20 has a barrel or cylindrical body portion 26 and a radial end flange 24 with a diameter greater than the outside diameter of the housing 22. Body portion 26 has a diameter slightly less than the diameter of the chamber 25 by an amount approximately equal to twice the thickness of the polishing pad 15. Body portion 26 is insertable into a first end of the cylindrical housing 22 to an intermediate position in chamber 25 as shown in FIG. 2. The interior end or tip of body portion 26 opposite fange 24 in the chamber 25 has an inwardly extending lip 27 with an inwardly tapered, outwardly facing wall 28 describing a circular opening 30. In the assembled relationship of FIG. 2, polishing pad 15 extends across opening 30 and has a skirt or edge 32 extending down and lodged between the outer walls of the mounting drum 20 and the annular wall 23 of the chamber 25 in a friction fit relationship. Central portion 31 of the polishing pad 15 across opening 30 is accessable for deposit of polish material 16 and interaction with contact lens 14 held by holder 18. Polishing drum 20 is frictionally retained in the housing 22 and is stopped from further movement therein by the flange 24.

Contact lens holder 18 is a resilient, rubber type member for holding a rigid contact lens. Holder 18 has an enlarged hollow bulb 33 at one end and a neck 34 at the other with an open tip 36. Other than tip 36, holder 18 is closed and normally carries a quantity of air. The walls of the bulb 33 are pliable and can be pushed together or squeezed to expel the air. Upon release of bulb 33 the walls tend to expand and draw air back in at tip 36. Squeezing and releasing bulb 33 creates a vaccum or suction at the tip 36 which holds the contact lens 14 in place. Upon installing the contact lens 14 with respect to the holder 18, the bulb portion 33 is squeezed, expelling air through the end opening 36 of throat 34. This is indicated in phantom by the bulb deformation in FIG. 2.

The contact lens is placed over the opening 36 and the bulb 33 released. The resultant suction or vaccum holds the contact lens 14 tight with respect to the neck 34 for manipulation with respect to the polishing pad 15. Other types of contact lens holders could be employed such as those having a standard suction cup at the end of a stem.

Contact lens holder 18 is installed in the mount 19 for rotation about a generally horizontal axis as shown in FIG. 2 such that a small degree of tilting is permitted to position the contact lens 14 with respect to the pad 15 as for polishing the edges thereof.

Mounting unit 19 is comprised as a roller bearing assemly having an outer race 37 and an inner race 38. The outer race 37 has an outer diameter slightly less than the diameter of the inner annular wall 23 of housing 22 so as fit therein in a light friction fit. Outer race 37 is coaxially movable in housing 22 upon application of light digital pressure but will generally stay in an axial position where it is left. Outer race 37 has an inwardly facing groove 40. Inner race 38 has a radially outwardly facing groove 41 in facing relationship to the groove 40 of the outer race. A plurality of roller bearings or ball bearings 42 are contained between the grooves 40, 41 of the race 37, 38. Inner race 38 is readily rotatable with respect to the outer race 37. A retaining ring 44 located in the space between the inner and outer races 37, 38 has a plurality of retaining fingers 45 disposed between adjacent ball bearings 42. Fingers 45 space bearings 42 and apart place them with respect to the inner and outer races to facilitate rotation of the inner race with respect to the outer race.

Inner race 38 has a central opening 46. Bulb 33 of contact lens holder 18 is frictionaly engaged in the central opening 46 of inner race 38. The bulb 33 can be rotated about a generally horizontal axis along with the inner race 38 for purposes of rotating the contact lens 14 with respect to the polishing cloth 15.

Polishing cloth 15 is of a suitable material such as velveteen for deposit of a contact lens polishing material 16. Velveteen material has a soft side suitable for contact with the contact lens, and a strong fabric side for purposes of durability. It is particularly adapted for cleaning the convex side of the contact lens which is more often scratched than the concave side. Foam type material is more appropriate on the concave or inside surface of the lens where the optic properties are formed.

In use of the apparatus to clean the convex side or front surface of a hard contact lens, polishing drum 20 is installed in the cylindrical housing 22 with the polishing cloth 15 extended over the top opening 30 and frictionally engaged with the skirt 32 wedged between the sides of the drum 20 and the annular walls 23 of housing 22. A polishing material 16 is deposited on the central portion 31 of polishing cloth 15. Contact lens holder 18 is installed in the central opening 46 of the inner race 38 of the mounting assembly 19. Bulb 33 is squeezed to expell air. The contact lens 14 is positioned at the tip 36 of neck 34. Bulb 33 is released so that a suction force holds the contact lens 14 in place with respect to holder 18. The outer race 37 of mount 19 is installed in the opposite end of the housing 22 to a position where the contact lens 14 bears upon the polishing material 16. The lens is manually rotated back and forth by back and forth rotation of the bulb end 33 of holder 18. A finger is insertable through the drum end of the housing 32 to a position of engagement with the opposite side of polishing cloth 15 in order to exert pressure where needed upon the convex surface of the contact lens 14. Rotation of holder 18 is gentle and does not damage the lens or create potentially dangerous heat build-up. The lens is removed for inspection from time to time. Chamber 25 is substantially closed and isolated from contaminants.

Figures 3, 5, 6, 7:
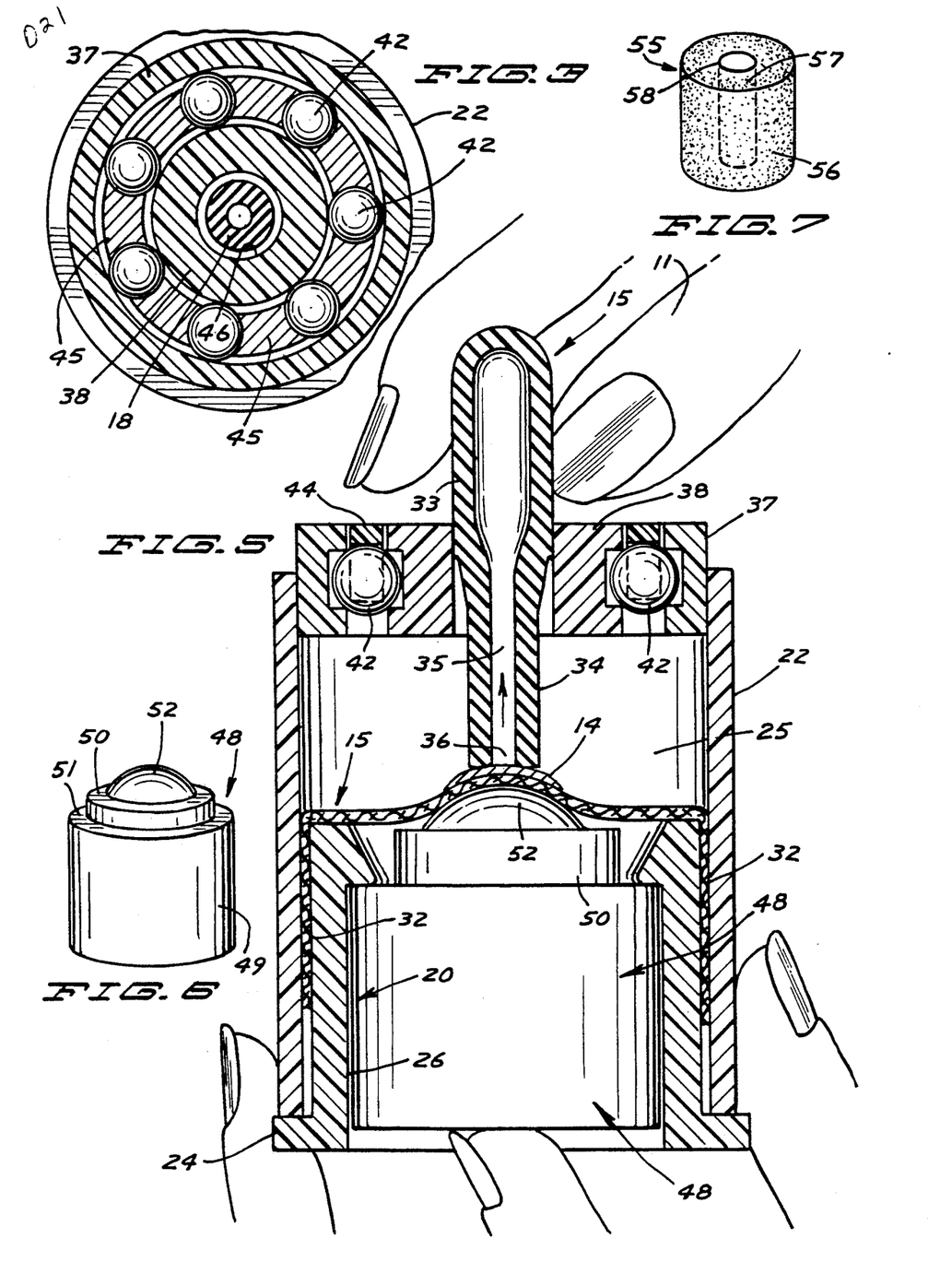
FIG. 3 is an enlarged sectional view of a portion of the lens surface treatment apparatus of FIG. 1 taken along the line 3—3 thereof.
FIG. 5 is a sectional view of the contact lens surface treatment apparatus like that shown in FIG. 2 but showing a lens mounting block in place for polishing the concave side of a rigid contact lens.
FIG. 6 is a perspective view of the lens mounting block shown in FIG. 5.
FIG. 7 is a perspective view of a foam cleaning tool for insertion into the retaining drum of the first embodiment of invention.

The concave side of a rigid contact lens can be polished with a convex tip tool 48 shown in perspective in FIG. 6 and in assembly relationship to the lens cleaning apparatus 10 in FIGS. 4 and 5. Tool 48 includes a cylindrical block 49 with an outside diameter slightly less than the inside diameter of the polishing cloth mounting drum 20. A reduced diameter cylindrical shoulder 50 is surrounded by ledge 51. Shoulder 50 extends upwardly from the block 49 and carrys a convex tip 52 formed about a radius less than that of a typical rigid contact lens. The tool 48 is insertable into the interior of the polishing cloth mounting drum 20 to a point where ledge 51 intercepts lip 27 of retainer 20. At that point the tip 52 engages and upwardly pushes the polishing cloth 15 at a location where it would normally come in contact with a contact lens to be polished. As shown in FIG. 5, the contact lens 14 is secured to the holder 18 with the convex surface facing upwardly. The tool 48 is inserted with respect to the polishing cloth 15 to form an upwardly extending, partially spherical bulge which engages the concave side of the contact lens. The holder 18 is manipulated and rotated as previously described in order to polish the concave surface of the contact lens. The pressure exerted upon the conact lens 14 is readily controllable through the fingers 50 of the opposite hand.

The main function of polishing is removal of scratches which occur primarily on the convex or outside of the lens. When cleaning only is required and scratch removal is not needed, a fabric backed foam cloth is preferred over a velveteen pad, and a surfacant cleaning solution in place of the polish. The use of a foam pad and liquid cleaning solution is gentler upon the lens optics. For cleaning of lens edges, a foam tool like that shown in FIG. 7 and indicated generally at 55 can be used. Tool 55 is comprised of a cylindrical foam block 56 with a diameter greater than the inside diameter of the opening of retainer 20. Block 56 is compressible so as to be fitted in the opening of the retainer 20 with a surface 57 exposed to chamber 25 for receipt of a contact lens. Block 56 has a tubular center opening 58 which provides an exposed circular edge for performance of a lens cleaning procedure with a cleaning solution deposited on the surface 57.

In terms of lens modification, the apparatus 10 is usable for modification of lens curvatures, i.e. peripheral, intermediate and posterior curves and blending curves. Tools like the tool 48 with convex tips of varying radii of curvature can be provided which correspond to the radius of curvature desired. Modification is performed in the same manner as the polishing of concave sides of lenses.

Figures 8, 9, 10:
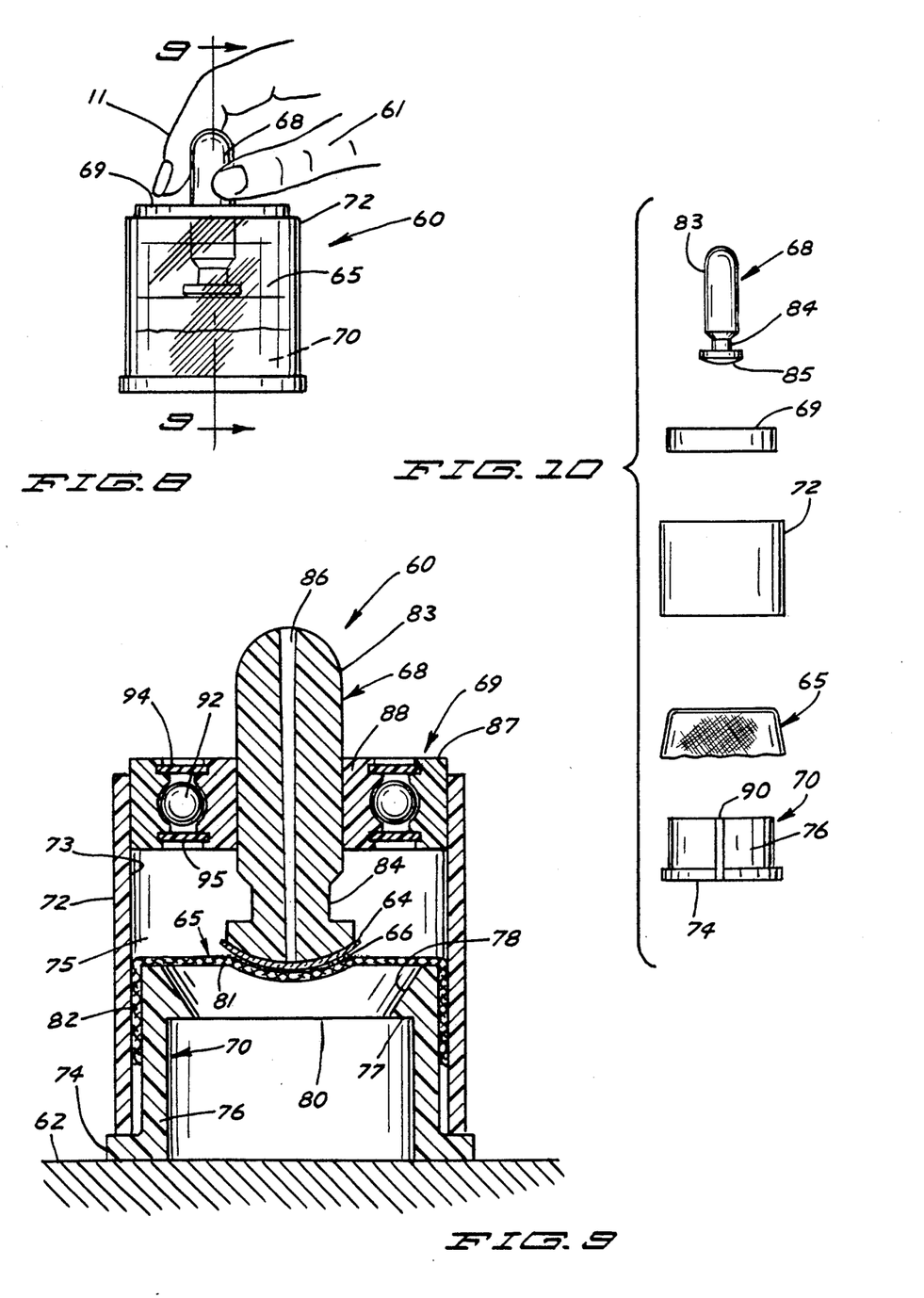
FIG. 8 is a side elevational view of a contact lens surface treatment apparatus according to another form of the invention shown in use in a contact lens cleaning procedure.
FIG. 9 is an enlarged sectional view of the contact lens surface treatment apparatus of FIG. 8 taken along the line 9—9 thereof.
FIG. 10 is an assembly view of the contact lens surface treatment apparatus of FIG. 8.

Referring to FIGS. 8 through 10, there is shown a contact lens surface treatment apparatus indicated generally at 60 and particularly adapted for cleaning of a soft contact lens by the individual lens wearer using a mild surfactent type cleaner so as not to damage the lens or leave a chemical residue that irritates the eye. Apparatus 60 is being minipulated by the fingers 61 of the end wearer of the contact lens. The lens surface treatment apparatus is shown in use to clean a soft contact lens 64 with respect to a cleansing pad 65 carrying a mild surfactant 66. Contact lens 64, as shown in FIG. 9, is secured to a soft contact lens holder 68 which is rotatably mounted in a contact lens holder mount or chuck 69. The cleaning pad 65 is stretched over the opening of a retainer or mounting drum 70 which is installed at one end of a sleeve or cylindrical housing 72.

Housing 72 is open ended, having a chamber 75 defined by an inner annular wall 73. Mounting drum 70 has a barrel or cylindrical body portion 76 and a radial end flange 74 having a diameter greater than the outside diameter of the housing 72. Body portion 76 has a diameter less than the diameter of the chamber 75 by an amount approximately equal to twice the thickness of the cleaning pad 65.

The side wall of drum 70 is interrupted by a longitudinal slit type opening 90 (see FIG. 10) extending from top to bottom. Slit 90 permits circumferencial compression of the side walls of drum 70 to facilitate insertion into housing 72 and provide for close friction fit. Body portion 76 installs in one end of the cylindrical housing 72 to an intermediate position in the chamber 75 as shown in FIG. 8. The interior end or tip of body portion 76 opposite flange 74 has an inwardly extending lip 77 with an inwardly tapered wall 78 describing a circular opening 80. In the assembled relationship of FIG. 8, cleaning pad 65 extends across the opening 80 and has a skirt or edge 82 extending down and lodged between the outer walls of the mounting drum 70 and the annular wall 73 of the chamber 75 in friction fit relationship. A central portion 81 or the polishing pad 65 across opening 80 is accessible for deposit of the surfactant cleaner 66 and interaction with contact lens 64 held by holder 68. Polishing drum 70 is frictionally retained in the housing 72 and is stopped from further movement therein by the flange 74.

Lens holder 68 is a ridgid member formed of a material such as plastic. Holder 68 is frictionally engaged in the inner race 88 of roller bearing mount 69. Outer race 87 is frictionally retained in the end of housing 72. Ball bearings 92 work between the inner and outer races. Closure rings 94, 95 are fixed to the outer race 87 and extend over the bearings 92 toward the inner race 88. Contact lens holder 68 rotates with the inner race 88 relative to the outer race 87.

The lens holder 68 is specifically adapted for holding a soft contact lens 64. A stem 83 is generally cylindrical and fits in frictionally retained relationship in the inner opening of the inner race 88 of the bearing mount 69. The stem 83 is of a convenient size for digital minipulation or twisting back and forth by the fingers. A neck 84 connects the body or stem 83 to a rounded head 85. Head 85 has a particlly spherical portion formed about a radius that is slightly less than the average radius of a soft contact lens and presents a smooth mounting surface. The head 85 is symetrical about a longitudinal axis extending through the neck 84 and the stem 83. A soft contact lens 64 having a slight moisture content readily adheres to the curved surface of the head 85.

An axial boar or opening 86 extends longitudinally through the holder 68. Boar 86 is circular and is inwardly tapered from the outer end of holder 68 toward the head 84. The purpose of boar 86 is for release of a contact lens 64 that has dried and become adhered to the head 85 thus making release difficult. A saline solution can be poured through the opening 86, or the operator can lightly blow through the opening or the like.

In use, the soft contact lens is placed on the head 85 of lens holder 68, preferably having at least a small moisture content in order that it will adhere to the head. Daily cleaning solution for cleaning the contact lens is placed on the cleaning pad 65. Cleaning pad 65 is preferably a laminate of foam and fabric as earlier described with the foam portion facing the contact lens cleaner for receipt of the contact lens and the cleaning solution. The mount is placed in the end of the housing to the point where the contact lens secured on the head 85 meets the surfactant solution 66 located on the cleaning pad 65. The spinner handle is rotated back and forth several times between the thumb and the finger while pressing the holder with the lense gently down against the cleaning pad. This is continued for a short period of time which is sufficient to remove tear film and mucous. The lens is then turned over, and a few more drops of cleaning solution are applied to the lens or the cleaning pad, and the porcedure is repeated on the other side. After cleaning, the lenses are rinsed and disinfected in the usual method.

While there has been shown and described certain embodiments of the invention, it will be apparent that certain deviations can be had from the embodiments shown without departing from the scope and spirit of the invention.

The embodiments of the invention in which an exclusive property or privilege is claimed are defined as follows:

1. A contact lens surface treatment apparatus comprising:
   a housing having a first open end and a second open end generally aligned with the first open end;
   a surface treatment pad retainer having side walls of dimension and shape to be inserted in the first end of the housing, said retainer having a central opening, a surface treatment pad having a central portion spanning the central opening of the retainer and having an edge extending from the central portion in overlapping relationship to the side walls of the retainer such that the edge is lodged between the side walls of the retainer and the inner walls of the first opening of the housing to frictionally hold the retainer in the housing;
   a contact lens holder;
   a contact lens holder mount having a outer portion and an inner portion rotatable with respect to the outer portion, said outer portion having an outer dimension and size to fit in the second open end of the housing in a light friction fit, said outer portion being releasably installed in the second open end of the housing;
   said contact lens holder assembled to said inner portion of the contact lens holder mount for rotation with the inner portion of the contact lens holder mount with respect to the outer portion, said contact lens holder having a stem extending into the housing toward the central opening of the retainer, said stem having a tip and means on the tip for holding a contact lens in contact with the pad for rotation of the contact lens holder to perform a surface treatment procedure.

2. The contact lens surface treatment apparatus of claim 1 wherein: said housing is a cylindrical sleeve with open ends comprising said first and second open ends.

3. The contact lens surface treatment apparatus of claim 2 wherein: said lens holder mount is comprised as a bearing assembly.

4. The contact lens surface treatment apparatus of claim 3 wherein: said bearing assembly includes an outer race and an inner race and a plurality of ball bearings between the inner and outer races for rotation of the outer race with respect to the inner race, said outer race having an outer diameter for a light friction fit in the second open end of the housing, said inner race having a central opening for installation of the contact lens holder.

5. The contact lens surface treatment apparatus of claim 4 wherein: said contact lens holder is adapted for holding a hard contact lens and includes a hollow bulb connected to said stem, said bulb being assembled with respect to the central opening of the inner race of the bearing assembly and being comprised of a resilient material enabling it to be squeezed to expel air and released to draw air back in, said stem having a tubular passage connecting the bulb to the tip whereby a contact lens can be retained by suction at the tip of the stem.

6. The contact lens surface treatment apparatus of claim 5 wherein: said retainer includes a cylindrical barrel having an open end insertable into the first end of the housing with the surface treatment pad extended across it, and a radial flange at the opposite end to limit movement of the barrel into the first open end of the housing.

7. The contact lens surface treatment apparatus of claim 6 including: a tool for assisting in surface treatment of the concave side of a contact lens, said retainer having a tubular opening from the flange end to the end inserted in the first end of the housing, said tool including a cylindrical block insertable in the retainer opening through the flange end, and a convex tip on the block positioned to bear against the polishing pad and produce a convex bulge for positioning the concave side of a contact lens when the block in inserted into the flange end of the retainer.

8. The contact lens surface treatment apparatus of claim 6 including: a slit opening on the side wall of the retainer extending from one end to the other.

9. The contact lens surface treatment apparatus of claim 8 wherein: said cylindrical sleeve comprising the housing is formed of a transparent material.

10. The contact lens surface treatment apparatus of claim 4 wherein: said retainer includes a cylindrical barrel having an open end insertable into the first end of the housing with the surface treatment pad extended across it, and a radial flange at the opposite end to limit movement of the barrel into the first open end of the housing.

11. The contact lens surface treatment apparatus of claim 4 wherein: said contact lens holder is a relatively rigid member adapted for holding a soft contact lens, having said stem frictionally retained in the inner race of the bearing assembly and of suitable size for digital minipulation, said tip comprised as a rounded head connected to the stem extending into the chamber orientated toward the central opening of the retainer with a generally spherical portion presenting a mounting surface for a soft contact lens.

12. The contact lens surface treatment apparatus of claim 11 including: an axial opening formed in the contact lens holder extending longitudinally through the holder from the stem to the tip.

13. The contact lens surface treatment apparatus of claim 12 wherein: said axial opening is inwardly tapered toward the tip.

14. The contact lens surface treatment apparatus of claim 11 wherein: said side walls of the surface treatment pad retainer have a longitudinal slit opening.

15. The contact lens surface treatment apparatus of claim 11 wherein: said retainer includes a cylindrical barrel having an open end insertable into the first end of the housing with the surface treatment pad extended across it, and a radial flange at the opposite end to limit movement of the barrel into the first open end of the housing.

16. The contact lens surface treatment apparatus of claim 15 wherein: said side walls of the retainer have a longitudinal slit opening.

17. The contact lens surface treatment apparatus of claim 16 wherein: said cylindrical sleeve comprising the housing is formed of a transparent material.

18. A contact lens surface treatment apparatus comprising:
a housing having a chamber with a first end and a second end opposite the first end with respect to the chamber;
surface treatment pad means releasably secured at the first end of the chamber;
a contact lens holder having a contact lens holding tip at one end;
means rotatably mounting the contact lens holder in the second end of the chamber with the lens holding tip extending into the chamber; means for manually rotating the contact lens holder about its axis and permitting limited axial movement of the tip in the chamber;
said pad means extending across the chamber with a portion located adjacent the lens holding tip of the lens holder whereby a contact lens held by the tip of the lens holder can be brought into surface contact with the pad means for performing a surface treatment procedure on the contact lens.

19. The contact lens surface treatment apparatus of claim 18 wherein: said contact lens holder is adapted for holding a hard contact lens and includes a hollow bulb connected to said tip, said bulb being assembled with respect to the means rotatably mounting the contact lens holder in the second end of the chamber and being comprised of a resilient material enabling it to be squeezed to expel air and released to draw air back in, said tip having a tubular passage connected to said bulb whereby a contact lens can be retained by suction at the tip of the contact lens holder.

20. The contact lens surface treatment apparatus of claim 19 wherein: means releasably securing the surface treatment pad means at the first end of the chamber includes a retainer having a cylindrical barrel with an open end insertable into the first end of the housing with the surface treatment pad means extended across it and a radial flange at the opposite end to limit movement of the barrel into the first end of the housing.

21. The contact lens surface treatment apparatus of claim 20 wherein: said retainer has a longitudinal slit opening in the side wall extending from one end to the other.

22. The contact lens surface treatment apparatus of claim 18 wherein: said contact lens holder is a relatively rigid member adapted for holding a soft contact lens, having a stem frictionally retained in the means rotatably mounting the contact lens holder and of a suitable size for digital manipulation, said tip connected to the stem and comprised as a rounded head extending into the chamber orientated toward the surface treatment pad means with a generally spherical portion presenting a mounting surface for a soft contact lens.

23. The contact lens surface treatment apparatus of claim 22 including: an axial opening in the contact lens holder extending from the end of the stem to the tip.

24. The contact lens surface treatment apparatus of claim 23 wherein: said axial opening is inwardly tapered toward the tip.

25. The contact lens surface treatment apparatus of claim 22 wherein: means releasably securing the surface treatment pad means at the first end of the chamber includes a retainer having a cylindrical barrel with an open end insertable into the first end of the housing with the surface treatment pad means extended across it and a radial flange at the opposite end to limit movement of the barrel into the first end of the housing.

26. The contact lens surface treatment apparatus of claim 25 wherein: said retainer side walls have a slit opening extending from one end to the other.

* * * * *

UNITED STATES PATENT AND TRADEMARK OFFICE
CERTIFICATE OF CORRECTION

PATENT NO. : 5,023,971
DATED : June 18, 1991
INVENTOR(S) : Larry W. Pompe

It is certified that error appears in the above-identified patent and that said Letters Patent is hereby corrected as shown below:

Col. 1, line 50, "curvatrure" should be -- curvature --.

Col. 2, line 27, "polising" should be -- polishing --.

Col. 3, line 41, "fange" should be -- flange --.

Col. 4, line 14, "assemly" should be -- assembly --.

Col. 4, line 17, insert "to" after -- as --.

Col. 4, line 58, "expell" should be -- expel --.

Col. 5, line 65, "minipulated" should be -- manipulated --.

Col. 6, line 36, "ridgid" should be -- rigid --.

Col. 6, line 49, "minipulation" should be -- manipulation --.

Col. 7, line 17, "porcedure" should be -- procedure --.

Col. 7, line 45, "a" should be -- an --.

Col. 8, line 37, "in" should be -- is --.

UNITED STATES PATENT AND TRADEMARK OFFICE
CERTIFICATE OF CORRECTION

PATENT NO. : 5,023,971

DATED : June 18, 1991

INVENTOR(S) : Larry W. Pompe

It is certified that error appears in the above-identified patent and that said Letters Patent is hereby corrected as shown below:

Col. 8, line 57, "minipulation" should be --manipulation--.

Signed and Sealed this

Eighth Day of December, 1992

Attest:

DOUGLAS B. COMER

Attesting Officer

Acting Commissioner of Patents and Trademarks